United States Patent
Taka

(10) Patent No.: US 6,700,651 B2
(45) Date of Patent: Mar. 2, 2004

(54) RANGING DEVICE

(75) Inventor: Hideo Taka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/119,678

(22) Filed: Apr. 11, 2002

(65) Prior Publication Data

US 2002/0149759 A1 Oct. 17, 2002

(30) Foreign Application Priority Data

Apr. 17, 2001 (JP) .......................................... 2001-117660

(51) Int. Cl.$^7$ .............................. G01C 3/00; G01C 3/08; G01C 5/00; G03B 13/34; G03B 3/10
(52) U.S. Cl. ..................... 356/3.14; 356/4.04; 396/123
(58) Field of Search .................. 356/3.14, 4.04, 356/3.13; 396/121, 123, 128, 139

(56) References Cited

U.S. PATENT DOCUMENTS

| | | | | |
|---|---|---|---|---|
| 5,255,064 A | * | 10/1993 | Maekawa ................... | 356/3.14 |
| 5,534,991 A | | 7/1996 | Maeda et al. .............. | 356/3.06 |
| 5,568,249 A | * | 10/1996 | Kawamura et al. ........ | 356/3.14 |
| 5,900,927 A | | 5/1999 | Hasegawa ................... | 356/3.13 |
| 5,960,219 A | * | 9/1999 | Kageyama et al. ......... | 396/104 |
| 6,047,136 A | * | 4/2000 | Nakamura .................. | 396/128 |
| 6,052,175 A | * | 4/2000 | Mori .......................... | 356/3.14 |
| 6,108,435 A | * | 8/2000 | Mori et al. ................. | 382/106 |
| 6,357,935 B1 | | 3/2002 | Taka et al. .................. | 396/349 |
| 6,433,859 B1 | * | 8/2002 | Nakata ....................... | 356/3.14 |

FOREIGN PATENT DOCUMENTS

| | | |
|---|---|---|
| JP | 7-110435 | 4/1995 |
| JP | 2000-89098 | 3/2000 |

* cited by examiner

Primary Examiner—Thomas H. Tarcza
Assistant Examiner—Brian Andrea
(74) Attorney, Agent, or Firm—Fitzpatrick, Cella, Harper & Scinto

(57) ABSTRACT

A distance/defocus device has a plurality of areas in an observing frame, and time sequentially determines the distance to an object or an amount of defocus for each area by performing a correlation calculation while shifting images of the object with respect to each other. The calculation time can be reduced by determining a shift range of the correlation calculation for subsequent areas on the basis of the result of the correlation calculation for a previous, predetermined area.

8 Claims, 5 Drawing Sheets

RANGING DEVICE

BACKGROUND OF THE INVENTION

1. Field of the Invention

The present invention relates to improved multipoint ranging devices which have a plurality of ranging areas in an observing frame or a shooting frame, and which calculate ranging information by a so-called phase difference method.

2. Description of the Related Art

In ranging devices using the phase difference method, two images of an object are formed by a pair of receiver lenses and detected by image sensors: the ranging device may be either a TTL type or a Non-TTL type.

The distance between the two images formed on the image sensors is determined by repeating a correlation calculation, and the amount of defocus or the distance to an object is calculated. Since a high load is placed on a CPU due to the correlation calculation, the amount of calculation must be reduced in order to reduce the calculation time.

On the other hand, in the case in which only one ranging area is set at the center of the shooting area, defocusing occurs when a main object is not at the center and a picture in which the main object is in focus cannot be taken.

Accordingly, various systems have been suggested and provided in which ranging operation is performed for a plurality of ranging areas set inside a shooting area. In such systems, pictures in which the main object is in focus can be taken even when the main object is not at the center of the shooting area.

However, the amount of calculation in the phase difference method is naturally large, and a high load is placed on the CPU even when the range data for only one ranging area is calculated. Accordingly, the release time-lag is long compared with other methods. Therefore, when the range data is calculated for a plurality of ranging areas, the release time-lag is further increased.

Accordingly, in Japanese Unexamined Patent Application Publication No. 7-110435, a technique is disclosed in which a contrast is determined for each ranging area and the main object is assumed to be at the ranging area corresponding to the maximum contrast. The distance calculation by the phase difference method is performed only for the ranging area in which the main object is assumed to be, so that the release time-lag is minimized.

In contrast, in Japanese Unexamined Patent Application Publication No. 2000-89098, a technique is disclosed in which a correlation calculation by the phase difference method is performed and the object distance is determined for each of the ranging areas. However, since the object is likely to be at the center of the shooting area under normal conditions, a shift range of the correlation calculation is set to be smaller for the ranging areas away from the center of the shooting area (peripheral areas) compared with the ranging area at the center of the shooting area. More specifically, in ranging areas away from the center of the shooting area, the distance range in which the object distance can be determined is limited only to distant regions so as to reduce the number of correlation calculations and the calculation time.

SUMMARY OF THE INVENTION

Accordingly, an object of the present invention is to provide a multipoint ranging device in which a correlation calculation is performed for each of a plurality of ranging areas without limiting the distance range in which the object distance can be determined in certain ranging areas, while still reducing the time for obtaining the result of a ranging operation.

According to one aspect, the present invention relates to a distance/defocus detection device which includes a sensor unit formed of a first sensor and a second sensor, the sensor unit receiving an object image in each of a plurality of areas set in a frame, and a calculator which calculates the distance to the object or an amount of defocus in each of the plurality of areas on the basis of a correlation between the image received by the first sensor and the image received by the second sensor, the correlation being determined while shifting the image signal of the first sensor relative to the image signal of the second sensor. The distance/defocus detection device includes a shift-range determination circuit which, after the correlation calculation is performed for a predetermined area, determines a shift range of the correlation calculation for a subsequent area of the plurality of areas on the basis of the result of the correlation calculation for the predetermined area.

According to another aspect, the present invention relates to a distance/defocus detection device which includes a sensor unit formed of a first sensor and a second sensor, the sensor unit receiving an object image in each of a plurality of areas, and a calculator which calculates the distance to the object or an amount of defocus in each of the plurality of areas on the basis of a correlation between the image received by the first sensor and the image received by the second sensor, the correlation being determined by shifting an image signal of the first sensor relative to an image signal of the second sensor. The distance/defocus detection device includes a setting circuit, which sets a shift-start position of the correlation calculation for each of the plurality of areas, and a shift-range determination circuit, which, after the correlation calculation is performed for a predetermined area, determines a shift-start position of the correlation calculation for a subsequent area, on the basis of the result of the correlation calculation for the predetermined area, and outputs the shift-start position to the setting circuit.

Further objects, features and advantages of the present invention will become apparent from the following description of the preferred embodiments with reference to the attached drawings.

DESCRIPTION OF THE PREFERRED EMBODIMENT

An embodiment of the present invention will be described below in detail with reference to the accompanying drawings.

Figure 1:
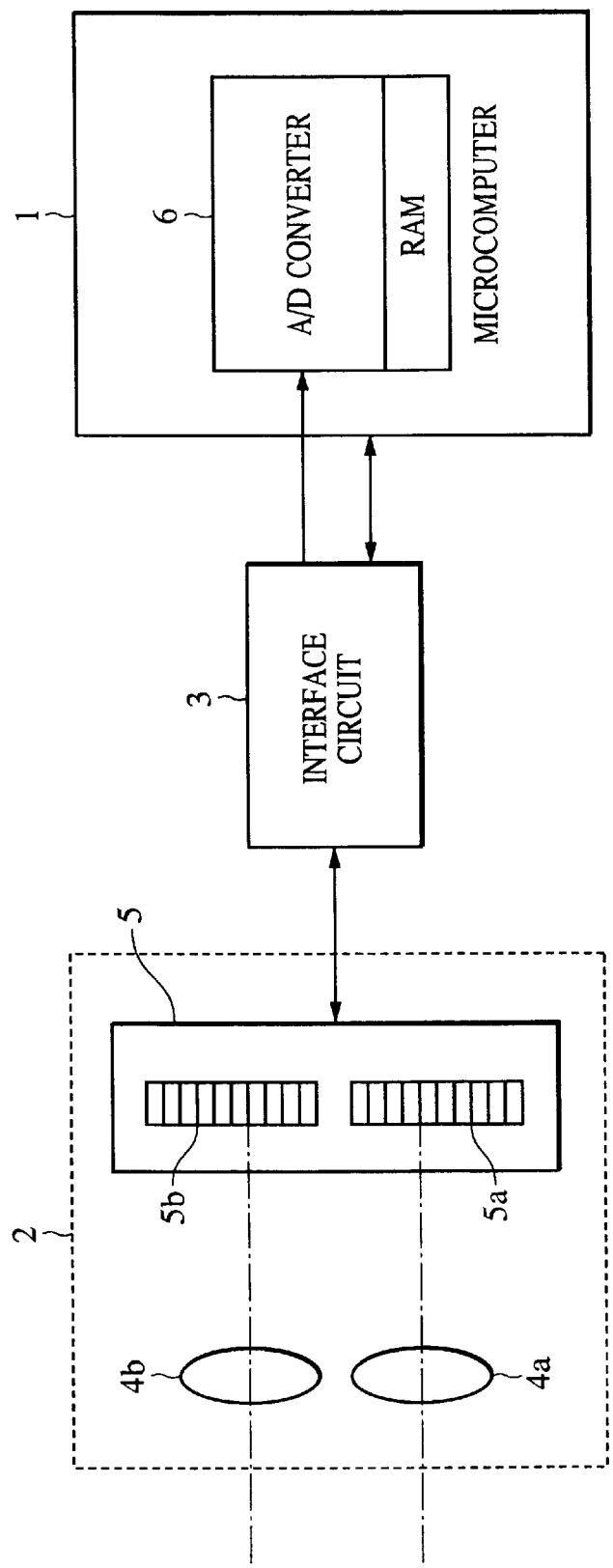
FIG. 1 is a block diagram showing the construction of the main part of a multipoint ranging device according to an embodiment of the present invention.

FIG. 1 is a block diagram showing the construction of the main part of a multipoint ranging device according to an embodiment of the present invention. The multipoint ranging device includes a microcomputer 1 which controls the overall system of the ranging device, a ranging unit 2 which determines the distance to an object, and an interface circuit 3 which controls the ranging unit 2.

The ranging unit 2 includes a pair of receiver lenses 4a and 4b and a line sensor unit 5 formed of a pair of line sensors which are referred to as a left (L) sensor 5a and a right (R) sensor 5b. The line sensor unit 5 is formed of photoelectric transducers such as CCDs, etc.

The receiver lenses 4a and 4b form images of an object on receiving surfaces, that is, detection surfaces, of the L and R sensors 5a and 5b, respectively. Each of the L and R sensors 5a and 5b outputs a detection signal representing the image formed on the receiving surface thereof. The microcomputer 1 calculates the object distance on the basis of sensor data obtained by collecting the detection signals.

The microcomputer 1 outputs a command to start integrating the detection signals obtained from the line sensor unit 5 to the interface circuit 3. Accordingly, the interface circuit 3 starts integrating the detection signals. Then, when the level of the collected detection signals reaches a predetermined value, the interface circuit 3 outputs an integration-complete signal to the microcomputer 1.

Next, the microcomputer 1 outputs an output command to the interface circuit 3, and the collected signals (sensor data) in the L and R sensors 5a and 5b are output to the microcomputer 1 via the interface circuit 3. The sensor data input to the microcomputer 1 are converted to digital data by an analog-to-digital (A/D) converter 6 installed in the microcomputer 1, and are stored in a random access memory (RAM) which is also installed in the microcomputer 1.

The microcomputer 1 calculates the object distance on the basis of the data obtained from the ranging unit 2 by a calculation process which will be described below, and drives an image-capturing lens in accordance with the calculated distance.

Next, a ranging process performed by the ranging unit 2 according to the embodiment of the present invention will be described below.

Figure 2:
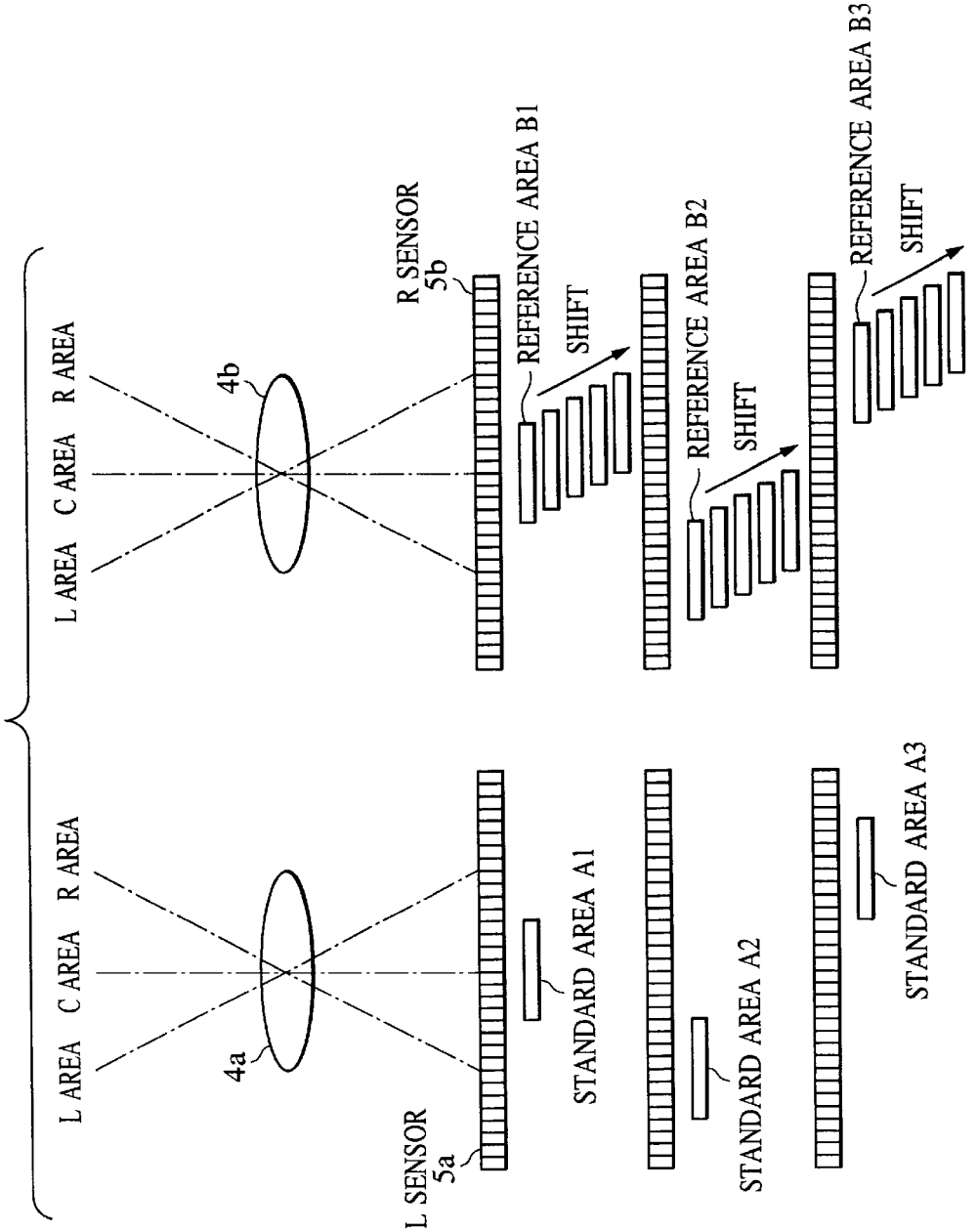
FIG. 2 is a diagram showing the relationship between ranging areas and positions where images are formed on line sensors according to the embodiment of the present invention.

FIG. 2 shows the relationship between the ranging areas and the positions where the images are formed on the L and R sensors 5a and 5b in the ranging unit 2. In the present embodiment, a shooting area includes, for example, three ranging areas (a left (L) area, a central (C) area, and a right (R) area). In addition, the L sensor 5a includes standard areas A (A1 to A3), and the R sensor 5b includes reference areas B (B1 to B3). The C area is set at the center of the shooting area, and an image of an object placed in the C area is formed on the standard area A1 of the L sensor 5a by the receiver lens 4a, and on the reference area B1 of the R sensor 5b by the receiver lens 4b. The reference areas B can be shifted along the R sensor 5b by the correlation calculation.

As the position of the reference area B is shifted, the correlation between the data of the L sensor 5a at the standard area A and the data of the R sensor 5b at the reference area B is calculated for each of the shifted positions. By determining the shift distance corresponding to the maximum correlation, the distance between the two images formed on the L and R sensors 5a and 5b can be determined.

The standard area A2 and the reference area B2 correspond to each other for the R area and the standard area A3 and the reference area B3 correspond to each other for the L area.

Figure 3:
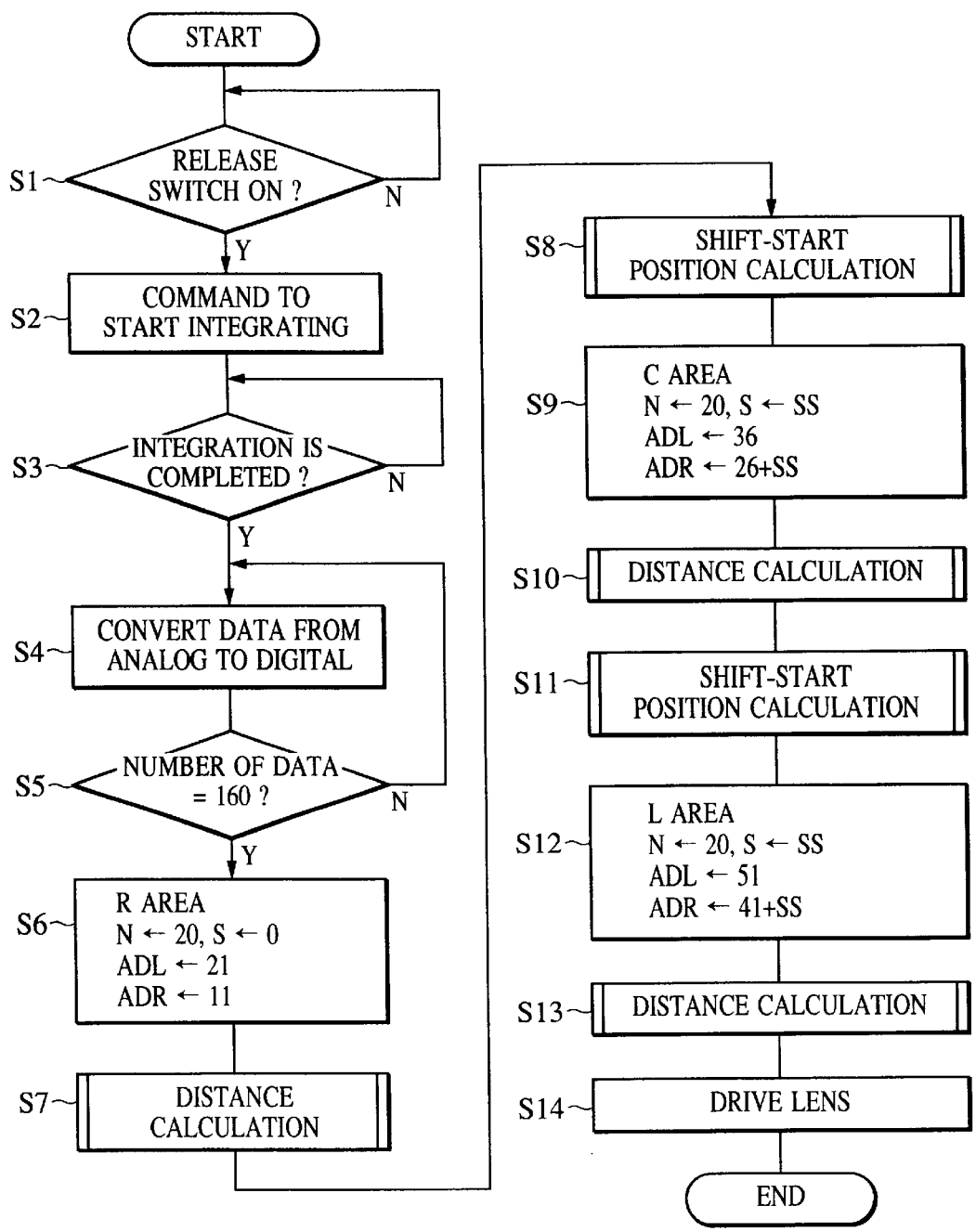
FIG. 3 is a flowchart of an operation according to the embodiment of the present invention.

A process of calculating the object distance by using the above-described construction according to the embodiment of the present invention will be described below with reference to a flowchart shown in FIG. 3.

First, it is determined whether a release switch is ON or OFF (S1). When the release switch is turned on, the microcomputer 1 outputs a command to start integrating the detection signals obtained from the line sensor unit 5 to the interface circuit 3 (S2). Accordingly, the interface circuit 3 starts integrating the detection signals obtained from the line sensor unit 5. Then, when the level of the collected detection signals reaches a predetermined value, the interface circuit 3 outputs the integration-complete signal to the microcomputer 1 (S3).

The microcomputer 1 waits until it receives the integration-complete signal, and then converts the output levels of the line sensors 5a and 5b obtained via the interface circuit 3 into digital data and stores them in the RAM (S4). When, for example, the line sensor unit 5 includes 80+80=160 pixels in the present embodiment, the microcomputer 1 stores the outputs from the line sensors 5a and 5b to RAM until the number of data items stored therein reaches 160 (S4→S5→S4 . . . ).

When the number of data items reaches 160 (when the result at S5 is YES), calculation parameters necessary for distance calculation for the R area, which is one of the ranging areas, are set (S6).

Figure 4A:
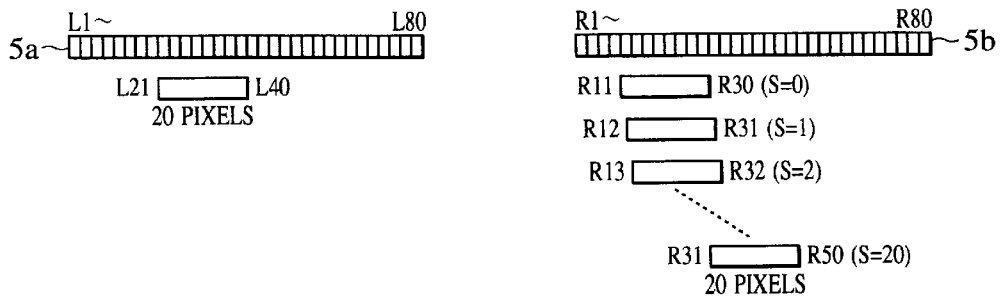
FIGS. 4A to 4C are diagrams showing pixels on the line sensors used for a correlation calculation according to the embodiment of the present invention.

With reference to FIG. 4A, the relationship between the calculation parameters and positions in the line sensors 5a and 5b will be described below.

Parameter N represents the number of digital data items obtained at each of the standard area A and the reference B in the line sensors 5a and 5b by A/D conversion of the detection signals. In addition, parameter S represents a shift distance of the reference area B for the correlation calculation, and the initial value of parameter S corresponds to a shift-start position. As will be described below, the shift-end position for the correlation calculation corresponds to S=20, and the distance range in which the object distance can be determined is increased as the initial value of parameter S is reduced. If the correlation between the standard area A and the reference area B is maximum when S=0, it means that the object is at the infinitely distant position. Accordingly, as parameter S corresponding to the maximum correlation is increased, it is determined that the object is at a closer position, and as parameter S corresponding to the shift-start position is increased, the distance range in which the object distance can be determined is reduced by excluding distant regions.

Parameter ADL represents the head position of the data obtained at the standard area A. More specifically, parameter ADL corresponds to one of the addresses of the 160 data items obtained by A/D conversion of the detection signals and stored in the RAM. Similarly, parameter ADR represents the head position of the data obtained at the reference area B. As shown in FIG. 4A, parameter ADL represents the address where the data corresponding to L21 on the line sensor 5a is stored and parameter ADR represents the address where the data corresponding to R11 on the line sensor 5b is stored.

Referring again to FIG. 3, after the above-described parameters are set, a distance-calculation subroutine is executed (S7).

The distance-calculation subroutine will be described below with reference to a flowchart shown in FIG. 5.

First, the correlation between the standard area A and the reference area B is calculated (S21). The correlation is expressed as the sum of absolute differences between the data of the line sensor 5a and the data of the line sensor 5b obtained at areas determined in accordance with the parameters set at S6, and a higher correlation exhibits a smaller sum.

When the correlation calculation at S=0 is finished, it is determined whether or not the shift distance S has reached 20, which indicates the shift-end position (S22). When it is determined that the shift distance S has not reached 20 yet, that is, when S is smaller than 20 (when the result at S22 is NO), the shift distance S is incremented (S23). Then, the reference area B is shifted and the correlation calculation is performed again at S21. When it is determined that the shift distance S has reached 20 (when the result at S22 is YES), the object distance is calculated on the basis of a maximum-correlation shift distance SM, which is the shift distance corresponding to the maximum correlation (S24).

Then, referring to FIG. 3 again, a shift-start position for the C area is determined before the distance calculation for the C area is performed (S8).

Next, a shift-start position calculation subroutine, which characterizes the present invention, will be described below with reference to a flowchart shown in FIG. 6.

In the present embodiment, the shift-start position of the correlation calculation for the subsequent ranging area (in this case, the C area) is determined on the basis of the maximum-correlation shift distance SM obtained in the distance calculation for the previous ranging area. More specifically, the maximum-correlation shift distance SM obtained in the distance calculation for the previous ranging area is set as an initial value SS of the shift distance S, the initial value SS corresponding to the shift-start position of the correlation calculation for the subsequent ranging area (S31).

Then, referring again to FIG. 3, calculation parameters necessary for distance calculation for the C area, which is one of the ranging areas, are set (S9).

Figure 4B:
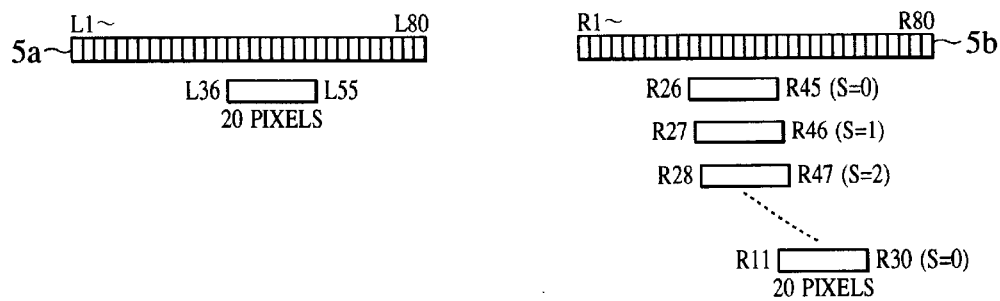

With reference to FIG. 4B, the relationship between the calculation parameters and positions in the line sensors 5a and 5b will be described below.

Parameter N is 20, as in the case of the R area. Parameter S is set to SS, which is determined at S8 and which corresponds to the shift-start position of the correlation calculation. Accordingly, the correlation calculation is not performed for regions corresponding to shift distances smaller than SS. More specifically, the correlation calculation is not performed at a shift range corresponding to regions farther than the object distance determined for the R area.

As shown in FIG. 4B, parameter ADL represents the address where the data corresponding to L36 on the line sensor 5a is stored and parameter ADR represents the address where the data corresponding to a position shifted from R26 by the shift distance SS on the line sensor 5b is stored.

After the above-described parameters are set, the distance-calculation subroutine is executed (S10). This subroutine is the same as that shown in FIG. 5, and explanation thereof is therefore omitted here. However, it is to be noted that since the shifting starts from a distance closer by the amount corresponding to the shift distance SS (the maximum-correlation shift distance obtained in the distance calculation for the R area), unnecessary repetitions of the correlation calculation for the background can be prevented. The distance to the object disposed at a close position is determined on the basis of the maximum-correlation shift distances SM for the R and C areas.

Figure 4C:
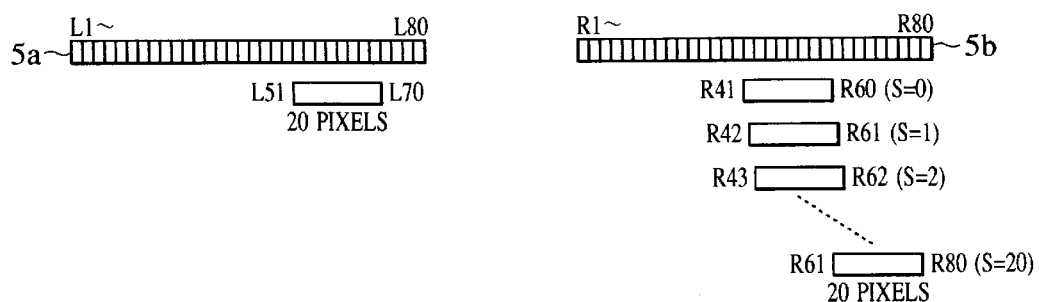

Then, at S11, a shift-start position for the L area is determined by the shift-start position calculation subroutine in a manner similar to S8. Then, calculation parameters necessary for distance calculation for the L area are set (S12). With respect to the parameters set for the L area, parameter ADL represents the address where the data corresponding to L51 on the line sensor 5a is stored and parameter ADR represents the address where the data corresponding to a position shifted from R41 by the shift distance SS on the line sensor 5b is stored. The relationship between the parameters and the positions in the line sensors 5a and 5b can be clearly understood by referring to FIG. 4C.

After the above-described parameters are set, the distance-calculation subroutine is executed (S13). This subroutine is similar to that shown in FIG. 5, and explanation thereof is therefore omitted here. However, it is to be noted that since the shifting starts from a distance closer by the amount corresponding to the shift distance SS, unnecessary repetitions of the correlation calculation for the background can be prevented. The distance to the object at a close position is determined on the basis of the maximum-correlation shift distances SM for the R, C and L areas.

Then, the image-capturing lens is driven in accordance with the calculated distance data (S14), and processes which are normally performed afterwards, such as exposure, etc., are performed.

Accordingly, the multipoint ranging device according to the above-described embodiment has a plurality of ranging areas (L area, C area, and R area), and calculates the distance to an object by performing the correlation calculation while shifting the images of the object formed by the receiver lenses 4a and 4b with respect to each other. The shift range of the correlation calculation for the subsequent ranging area (C area and L area) is limited by the amount corresponding to the shift distance SS, which is determined on the basis of the result of the correlation calculation for the previous ranging area (R area for the C area, and the C area for the L area). Accordingly, the correlation calculation is performed for each of the ranging areas without limiting the distance range in which the object distance can be determined in certain ranging areas, and still the time required for the ranging operation can be reduced.

In addition, the correlation calculation for a shift range corresponding to regions farther than the distance determined on the basis of the maximum-correlation shift distance SM obtained in the correlation calculation for the previous ranging area is not performed in the subsequent ranging area. Accordingly, unnecessary repetitions of the correlation calculation for the background can be prevented and the distance to the object disposed at the closest position can be calculated.

Modifications

In the above-described embodiment, the distance calculation is performed in the order of R area, C area, and L area. However, the distance calculation for the C area, where the main object is most likely to be at the closest position, is preferably performed first, since there is a higher probability that the total calculation time then will become the shortest. More specifically, the correlation calculation for the ranging area at the center is preferably performed earlier than the correlation calculation for the ranging areas at peripheral regions. In such a case, the shift range of the correlation calculation for the ranging areas at peripheral regions is limited on the basis of the result of the correlation calculation for the ranging area at the center where the main object is more likely to be at the closest position. Accordingly, there is a higher probability that the time for the ranging operation can be reduced.

Figure 5:
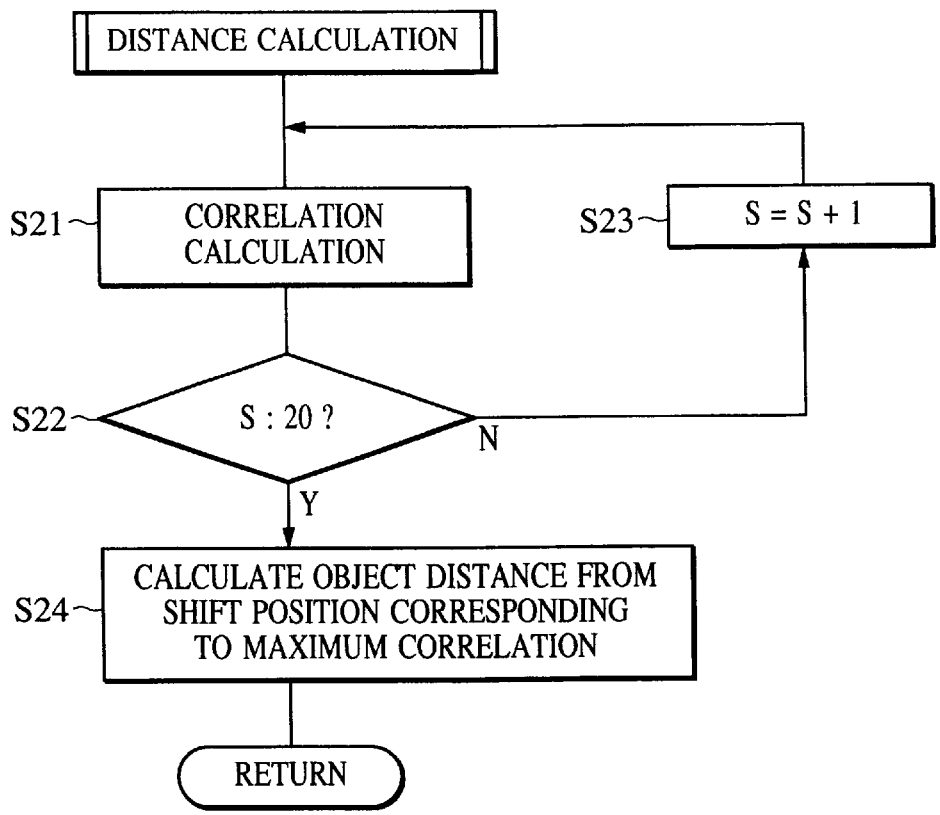
FIG. 5 is a flowchart of a distance-calculation subroutine according to the embodiment of the present invention.

In addition, in the distance-calculation subroutine shown in FIG. 5, the object distance is calculated only on the basis of the maximum-correlation shift distance SM. However, if it is determined that the reliability of this result is low by comparing the correlation with a predetermined value, SM may be set to 0 and 0 may be used as the shift distance corresponding to the shift-start position of the reference area B in the correlation calculation for the subsequent ranging area.

Figure 6:
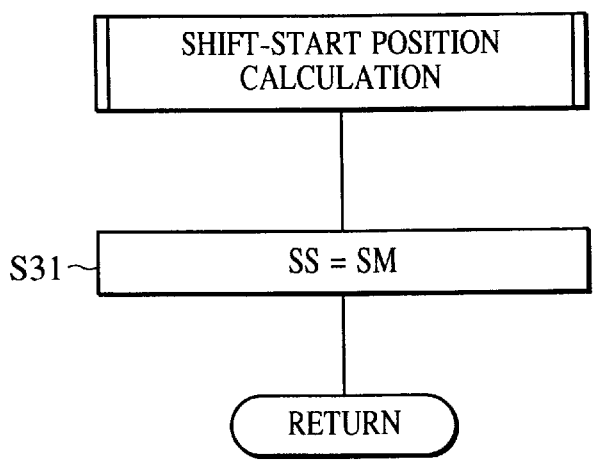
FIG. 6 is a flowchart of a shift-start position calculation subroutine according to the embodiment of the present invention.

In addition, in the shift-start position calculation subroutine shown in FIG. 6, the shift-start position SS is set to the maximum-correlation shift distance SM obtained in the distance calculation for the previous ranging area. However, in order to select the object corresponding to the maximum correlation in the depth of field, SS may be set to SM−α (SS is set to 0 if SS<0). Thus, in the distance calculation for the subsequent ranging area, the correlation calculation is not performed at a shift range corresponding to regions farther than the distance corresponding to the maximum-correlation shift distance SM by the amount larger than the amount corresponding to the predetermined amount α. Accordingly, the distance to the object disposed at a close position in the depth of field can be determined.

Although a Non-TTL-type multipoint ranging device is explained in the above-described embodiment, the present invention may also be applied to a TTL-type device (a device in which the focal point is detected). In such a case, the unnecessary correlation calculations for the background can be omitted in the subsequent ranging area on the basis of the amount of defocus determined for the previous ranging area (focal point detection area).

The present invention is not limited to ranging devices installed in cameras, and may be applied to various optical devices containing a device for calculating the object distance or the amount of defocus.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A distance/defocus detection device, comprising:
a sensor unit formed of a first sensor and a second sensor, the sensor unit receiving an object image in each of a plurality of areas set in a frame;
a calculator which calculates the distance to the object or an amount of defocus in each of the plurality of areas on the basis of a correlation between the image received by the first sensor and the image received by the second sensor, the correlation being performed for the plurality of areas in a prescribed order, and the correlation being determined while shifting an image signal of the first sensor relative to an image signal of the second sensor; and
a shift-range determination circuit which, after the correlation calculation is performed for a predetermined area of the plurality of areas, determines a shift range of the correlation calculation for a next area in the prescribed order of the plurality of areas on the basis of the result of the correlation calculation for the predetermined area.

2. A distance/defocus detection device according to claim 1, wherein correlation calculations for the plurality of areas are performed time sequentially, and the predetermined area is the area for which the correlation calculation is performed first.

3. A distance/defocus detection device according to claim 1, wherein after the correlation calculation for the predetermined area is performed, the shift-range determination circuit determines a shift-start position of the correlation calculation for the next area in the prescribed order on the basis of the result of the correlation calculation for the predetermined area.

4. A distance/defocus detection device according to claim 1, wherein, after the correlation calculation for the predetermined area is performed, the shift-range determination circuit determines the shift range of the correlation calculation for the next area in the prescribed order on the basis of a shift position corresponding to the maximum correlation obtained in the correlation calculation for the predetermined area.

5. A distance/defocus detection device according to claim 3, wherein the correlation calculations for the plurality of areas are performed time sequentially, and the predetermined area is determined as the area for which the correlation calculation is performed first.

6. A distance/defocus detection device according to claim 4, wherein the correlation calculations for the plurality of areas are performed time sequentially, and the predetermined area is determined as the area for which the correlation calculation is performed first.

7. A distance/defocus detection device comprising:
a sensor unit formed of a first sensor and a second sensor, the sensor unit receiving an object image in each of a plurality of areas set in a frame;
a calculator which calculates the distance to the object or an amount of defocus in each of the plurality of areas on the basis of a correlation between the image received by the first sensor and the image received by the second sensor, the correlation being determined while shifting an image signal of the first sensor relative to an image signal of the second sensor;
a setting circuit which sets a shift-start position of the correlation calculation for each of the plurality of areas; and
a shift-range determination circuit which, after the correlation calculation for a predetermined area is performed, determines a shift-start position of the correlation calculation for a subsequent area on the basis of the result of the correlation calculation for the predetermined area, and outputs the shift-start position to the setting circuit.

8. A distance/defocus detection device according to claim 7, wherein a shifting operation starts at the shift-start position, and the correlation calculation is performed for regions closer than the position of the object corresponding to the shift-start position.

* * * * *